W. BAUERSFELD.
CINEMATOGRAPHIC APPARATUS.
APPLICATION FILED MAR. 13, 1914.

1,219,221.

Patented Mar. 13, 1917.
2 SHEETS—SHEET 1.

W. BAUERSFELD.
CINEMATOGRAPHIC APPARATUS.
APPLICATION FILED MAR. 13, 1914.
1,219,221.
Patented Mar. 13, 1917.
2 SHEETS—SHEET 2.
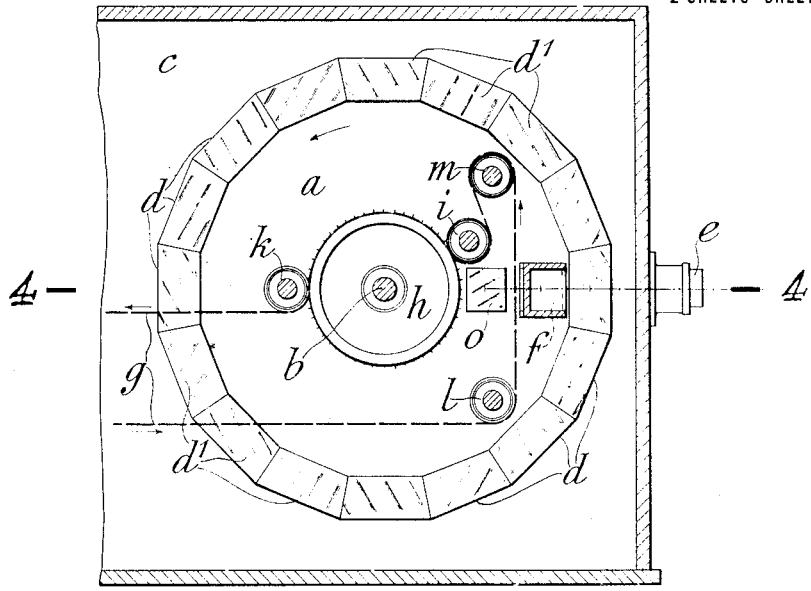
Fig.3
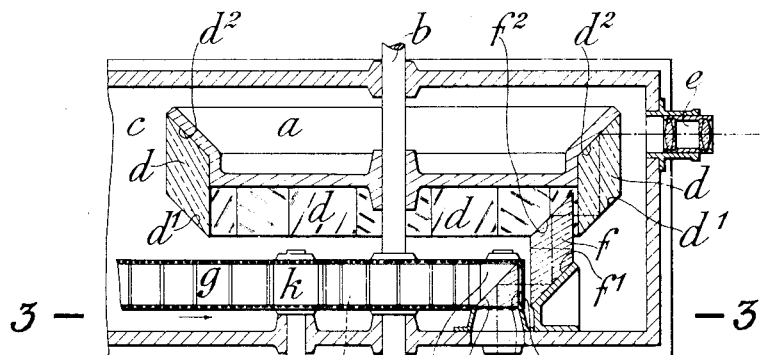
Fig.4
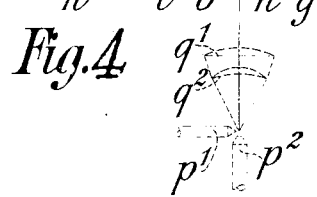
Witnesses:
Inventor:
Walther Bauersfeld.

UNITED STATES PATENT OFFICE.

WALTHER BAUERSFELD, OF JENA, GERMANY, ASSIGNOR TO THE FIRM OF CARL ZEISS, OF JENA, GERMANY.

CINEMATOGRAPHIC APPARATUS.

1,219,221.  Specification of Letters Patent.  Patented Mar. 13, 1917.

Application filed March 13, 1914. Serial No. 824,527.

*To all whom it may concern:*

Be it known that I, WALTHER BAUERSFELD, a citizen of the German Empire, residing at Jena, Germany, have invented a new and useful Cinematographic Apparatus, of which the following is a specification.

Figure 1:
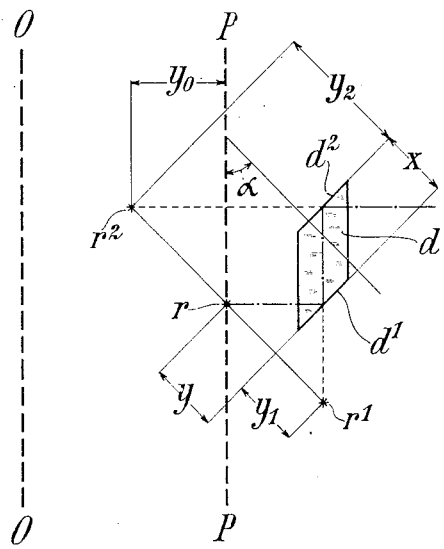
Figure 2:
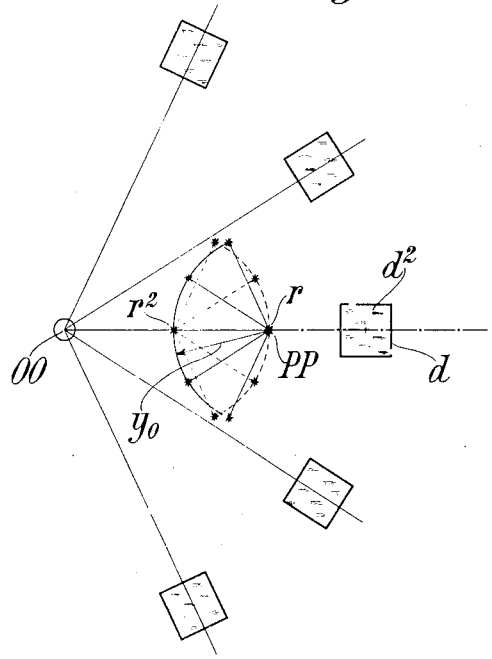

The present invention relates to cinematographic apparatus having an uninterruptedly traveling picture-carrier and optical compensation of the wandering of the image by means of a uniformly rotated drum, which is fitted at its periphery with reflectors. Several such apparatus have been constructed, but since the reflector-drums used with them are provided only with simple reflectors or optical squares, they do not give absolutely stationary images. As is well known, the principal cause of the above defect in the said apparatus is to be sought in the fact, that the surface of the reflected picture-carrier itself rotates with the rotation of the compensating reflectors. With the new arrangement a more perfect optical compensation of the movement of the picture-carrier is made possible, by two rings of plane reflectors being fixed to the compensating drum, which face each other, are parallel in pairs and, with a constant relative distance, are inclined to the axis of the drum by a constant angle. One compensating element of the drum, therefore, consists with such an arrangement of a pair of parallel plane reflectors having a constant relative distance. In Figures 1 and 2 of the annexed drawing the effect produced by a pair of parallel plane reflectors is diagrammatically shown in Figs. 3 and 4 a constructional example of a cinematographic apparatus according to the invention is shown, Fig. 3 being a longitudinal section and Fig. 4 a cross-section, the apparatus being supposed to be used as a projection apparatus (for apparatus for taking the photograms the drawing is to be imagined as suitably altered).

In Fig. 1 a double reflecting prism $d$ is shown, the relative distance of the reflecting surfaces $d^1$ and $d^2$ being designed by $x$. The fact, that the space between the reflecting surfaces is not filled by air but by glass, is neglected in the following schematical calculations. A ray pencil emanating from a point $r$ is indicated in the drawing by its axial ray, the point $r$ lying at a distance $y$ from the plane of the surface $d^1$. The surface $d^1$ reflects the rays emanating from the point $r$ in such a manner that a virtual image $r^1$ is formed lying, as well known, behind the surface $d^1$ at a distance $y^1$ which is equal to $y$. A virtual image $r^2$ of this image $r^1$ is formed by the other reflecting surface $d^2$, lying behind the surface $d^2$ at a distance $y_2$, that is equal to the distance between the virtual image $r^1$ and the plane of the reflecting surface $d^2$, i. e., equal to $x+y_1$. Hence the distance between the images $r^1$ and $r^2$ is equal to $$y_2+x+y_1,$$

i. e., equal to $2x+2y_1$. Therefore the distance between the point $r$ and the image $r^2$, which image $r^2$ is the final image formed from the point $r$ by the entire reflecting system $d^1$, $d^2$, is equal to $$2x+2y_1-2y_1,$$

i. e., equal to $2x$. Obviously the object-point $r$ and the image-points $r^1$ and $r^2$ lie on one line, which line is perpendicular to the (parallel) reflecting surfaces. Generally speaking: each such pair of reflectors forms an image of a point in space in such a manner that the connecting line of object-point and image-point is perpendicular to the planes of the reflectors and its length always equal to twice the relative distance of the parallel reflectors. If the pair of reflectors be rotated about any axis, the image-point belonging to an object-point will rotate about an axis, which is parallel to the said axis of rotation of the reflector, while maintaining the constant distance from its object-point. Hence, on the pair of reflectors being rotated, the image of each plane remains parallel to the plane itself. Let us suppose the prism $d$ shown in Fig. 1 to be rotated about an axis OO lying, for instance, in the plane of the paper. Hence the image-point $r^2$ would rotate about an axis PP passing through the object-point $r$ and being parallel to the axis OO. The radius $y_0$ of the circle described by the point $r^2$, while so rotating, is equal to the relative distance $y_2$ of the object-point $r$ and the image-point $r^2$ multiplied by the sine of the angle $\alpha$ formed by a line perpendicular to the plane of the reflector with the axes PP and OO.

According to the present invention such pairs of reflectors perform a circular motion about the axis of the drum. Thus, the image-point of an object-point, which for the present shall be supposed to be stationary, rotates, on the reflector-drum rotating, about an axis, which is parallel to the axis of the drum and passes through the object-point, and describes, while so rotating, an arc of a circle, the radius of which is equal to the product derived from twice the relative distance of the two parallel reflectors and the sine of the angle formed by the perpendicular to the reflector with the axis of the drum. Fig. 2 is a cross-section of Fig. 1, the prism $d$ in it being shown in five different positions. The image-point $r^2$ rotates on a circle, the radius of which is $y_0$. As the connecting line of the object-point $r$ and the image-point $r^2$ always is perpendicular to the planes of the reflecting surfaces, the positions of the image-point $r^2$ on this circle pertaining to the different positions of the prism $d$ may be found each by tracing a line through the object-point $r$, which line is parallel to the radius vector pertaining to the corresponding position of the prism $d$. Obviously the image-point $r^2$ will not wander but will keep its middle position, while the prism $d$ rotates, if the object-point $r$ does not remain stationary but rotates simultaneously with the prism $d$ in the same direction and with the equal angular velocity on a circle around the image-point $r^2$ (as indicated in Fig. 2 with dotted lines). The plane of the film containing the object-point will, in the case described, always remain parallel to itself.

When the picture-carrier is moved not on a circle, as above described, but, as usual in practice, in a straight line, being a tangent of the circle, for each picture only that portion of the above-named arc, on which the movement of an image-point, arising during a rotation of the reflector, is compensated by the corresponding movement of the object-point, is of use, within which tangent and arc coincide sufficiently accurately. It may be mentioned that in practice a much smaller arc comes in question than the arc formed by the radii vectors pertaining to the two outermost of the five positions of the prism $d$, as shown in Fig. 2. In this figure the arc is exaggerated for sake of clearness. The said portion must, therefore, be consistent with the size of the picture and, as the latter is as a rule given, the radius of the above-named circle and thus the relative distance of the two parallel reflectors must be chosen of a corresponding size. In order, furthermore, to avoid any lateral displacement of the image-points, the compensating drum must be placed in the path of the rays of the cinematographic apparatus in such a manner that the axis of the image-rays impinging on the drum is approximately perpendicular to the axis of rotation of the drum. When this is strictly the case, the optical axis lies in the plane of that one of the above-named circles, which belongs to the center of the picture. Each pair of parallel reflectors will be with advantage constructed as a prism having two surfaces reflecting into the interior of the prism.

A particularly simple arrangement of the cinematographic apparatus is obtained, when the reflector-drum and the traversing wheel for the picture-carrier are fixed together coaxially. With such an arrangement it is important, that the radius of the traversing wheel must be equal to the radius of the above-named circle, on which the image-point of a supposed stationary object-point moves, on the reflector-drum rotating, viz. equal to the product derived from twice the relative distance of the two parallel reflectors and the sine of the angle formed by the perpendicular to the reflector with the axis of the drum.

A drum marked $a$ is rotatably journaled by means of its shaft $b$ in a casing $c$; it is to be rotated steadily by driving means not shown in the drawing. The periphery of the drum $a$ is fitted with reflecting prisms $d$, which are all of one size, are contiguous to one another in radial surfaces and of which each has two parallel reflecting surfaces $d^1$ and $d^2$, which are inclined to the axis of the drum by 45°. In front of the ring of reflecting surfaces, which faces outwardly, laterally of the drum and at the same height as the axis of rotation a projection objective $e$ is fixed to the casing $c$, while in front of the inwardly reflecting ring and at the same height there is disposed first of all a stationary auxiliary prism $f$ also having two parallel reflecting surfaces $f^1$ and $f^2$, which are inclined to the axis of the drum by 45°. The film-band $g$ receives a regular motion corresponding to the arrows shown in the drawing by means of a traversing wheel $h$, which is fixed to the drum shaft $b$, two idlers $i$ and $k$ insuring the proper engagement of the traversing wheel. The film-band $g$ is guided in a straight line by two additional idlers $l$ and $m$ along the effective part of its path in front of and past the auxiliary prism $f$. In front of the film-band $g$ there is a diaphragm $n$, which bounds the surface corresponding to the size of the picture, and a reflecting prism $o$, which throws the rays of light, coming from the side, onto the film. The illumination of the film-band $g$ is effected by means of an electric arc lamp mounted outside the apparatus, the two carbons $p^1$ and $p^2$ of which are indicated, and a condenser system represented by two lenses $q^1$ and $q^2$.

I claim:

In a cinematographic apparatus the combination with an uninterruptedly traveling picture-carrier of a uniformly rotated reflector-drum, the said drum having on its periphery two rings of evenly distributed plane reflectors, the reflecting surfaces of which, facing each other, are parallel in pairs and, with a constant relative distance apart, are inclined to the axis of the drum by a constant angle, the reflector-drum being placed in the path of the rays in such a manner that the axis of the image-forming rays, on impinging on the drum, is directed approximately perpendicularly to the axis of rotation of the latter.

WALTHER BAUERSFELD.

Witnesses:
PAUL KRÜGER,
RICHARD HAHN.